(12) United States Patent
Shimizu et al.

(10) Patent No.: US 11,859,992 B2
(45) Date of Patent: Jan. 2, 2024

(54) ESTIMATION APPARATUS, ESTIMATION METHOD AND PROGRAM

(71) Applicant: NIPPON TELEGRAPH AND TELEPHONE CORPORATION, Tokyo (JP)

(72) Inventors: Hitoshi Shimizu, Tokyo (JP); Tatsushi Matsubayashi, Tokyo (JP); Yusuke Tanaka, Tokyo (JP); Takuma Otsuka, Tokyo (JP); Hiroshi Sawada, Tokyo (JP); Tomoharu Iwata, Tokyo (JP); Naonori Ueda, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 614 days.

(21) Appl. No.: 17/040,518

(22) PCT Filed: Mar. 26, 2019

(86) PCT No.: PCT/JP2019/012909
§ 371 (c)(1),
(2) Date: Sep. 22, 2020

(87) PCT Pub. No.: WO2019/189207
PCT Pub. Date: Oct. 3, 2019

(65) Prior Publication Data
US 2021/0025724 A1 Jan. 28, 2021

(30) Foreign Application Priority Data

Mar. 27, 2018 (JP) .................. 2018-060685

(51) Int. Cl.
*G01C 21/34* (2006.01)
*G01C 21/36* (2006.01)
*G08G 1/065* (2006.01)

(52) U.S. Cl.
CPC ..... *G01C 21/3492* (2013.01); *G01C 21/3691* (2013.01); *G08G 1/065* (2013.01)

(58) Field of Classification Search
CPC . G01C 21/3492; G01C 21/3691; G08G 1/065
See application file for complete search history.

(56) References Cited

U.S. PATENT DOCUMENTS

| | | | |
|---|---|---|---|
| 6,490,519 B1* | 12/2002 | Lapidot | G08G 1/096775 701/119 |
| 6,813,555 B1* | 11/2004 | Kerner | G06T 9/004 701/117 |

(Continued)

FOREIGN PATENT DOCUMENTS

| | | |
|---|---|---|
| JP | 2004213098 | 7/2004 |
| JP | 2005-182383 | 7/2005 |
| JP | 5060513 | 8/2012 |

OTHER PUBLICATIONS

Zhang, Yin, et al., "Fast Accurate Computation of Large-Scale IP traffic Matrices from Link Loads" Sigmetrics Jun. 10-14, 2003, San Diego, CA, ACM 1-58113-664-1/03/0006.

(Continued)

*Primary Examiner* — Luis A Martinez Borrero (57) ABSTRACT

The present disclosure relates to an apparatus and methods of estimating a traffic volume of moving objects. In particular, the present disclosure estimates the traffic volume based on amounts of traffic volume of the moving objects observed at observation points based on a routing matrix and a visitor matrix. The routing matrix indicates whether moving objects that pass through specific waypoints are to be observed at an observation point. The visitor matrix indicates whether a moving object departing or arriving at the observation point. The present disclosure enables estimating a traffic volume of (Continued)

moving objects on various routes based on observed data with errors in data and varying lengths in observation periods.

17 Claims, 9 Drawing Sheets

(56) References Cited

U.S. PATENT DOCUMENTS

| | | | | |
|---|---|---|---|---|
| 7,808,923 | B2* | 10/2010 | Kodialam | H04L 41/14 370/252 |
| 8,972,171 | B1* | 3/2015 | Barth | G01C 21/3667 340/995.13 |
| 9,564,048 | B2* | 2/2017 | Liu | G08G 1/0116 |
| 9,719,792 | B2* | 8/2017 | Barth | G01C 21/3667 |
| 10,049,567 | B2* | 8/2018 | Asai | G08G 1/0116 |
| 10,545,247 | B2* | 1/2020 | Zheng | G08G 1/065 |
| 2005/0220023 | A1* | 10/2005 | Kodialam | H04L 41/14 370/235 |
| 2008/0071465 | A1* | 3/2008 | Chapman | G08G 1/0104 701/117 |
| 2008/0219181 | A1* | 9/2008 | Kodialam | H04L 41/14 370/252 |
| 2011/0173015 | A1* | 7/2011 | Chapman | G08G 1/0129 701/119 |
| 2012/0112928 | A1* | 5/2012 | Nishimura | G08G 1/07 340/909 |
| 2012/0150425 | A1* | 6/2012 | Chapman | G08G 1/0104 701/119 |
| 2013/0289862 | A1* | 10/2013 | Chapman | G08G 1/012 701/119 |
| 2014/0149030 | A1* | 5/2014 | Chapman | G08G 1/012 701/119 |
| 2016/0133127 | A1* | 5/2016 | Smereka | G01C 21/26 701/118 |
| 2016/0180705 | A1* | 6/2016 | Liu | G08G 1/0175 701/117 |
| 2017/0122759 | A1* | 5/2017 | Barth | G08G 1/0133 |
| 2017/0206782 | A1* | 7/2017 | Asai | G08G 1/0133 |
| 2017/0285181 | A1* | 10/2017 | Zheng | G08G 1/065 |
| 2022/0327924 | A1* | 10/2022 | To | G08G 1/065 |

OTHER PUBLICATIONS

The 20 Informatics Learning Theory Workshop (IBIS 2017) http://ibisml.org/ibis2017/, Nov. 8, 2017.

The 20 Informatics Learning Theory Workshop, Nov. 8, 2017, Discussion Truck Connection Day 2, http://ibisml.org/bis2017/discussion2/.

Jin, Shimizu, et al. "D2 In the human flow simulation" Estimating Agent Parameters, NTT 2017.

* cited by examiner

| OBSERVATION TIME SLOT | OBSERVATION POINT | | | | |
|---|---|---|---|---|---|
| | $M_1$ | $M_2$ | $M_3$ | ... | $M_J$ |
| $t = 0$ TO $t = 1$ | $Y_{11}$ | $Y_{12}$ | $Y_{13}$ | ... | $Y_{1J}$ |
| $t = 1$ TO $t = 2$ | $Y_{21}$ | $Y_{22}$ | $Y_{23}$ | ... | $Y_{2J}$ |
| ... | ... | ... | ... | ... | ... |
| $t = T-1$ TO $t = T$ | $Y_{T1}$ | $Y_{T2}$ | $Y_{T3}$ | ... | $Y_{TJ}$ |

$$Obj = \sum_{t=1}\sum_{j}\left|\sum_{i}A_{j,i}X_{t,i} - Y_{t,j}\right|^2 + \lambda_3\sum_{t=1}\sum_{j}\sum_{j'}\left|\sum_{i}B_{j,j',i}X_{t,i} - \Delta S_{t,j,j'}\right|^2 + \lambda_2\sum_{t=1}\sum_{i}|X_{t,i}|^2 \quad \cdots \text{(FORMULA 3)}$$

ERROR IN NUMBER OF PASSERS-BY MINIMIZED

ERROR IN VISITOR NUMBER VARIATION MINIMIZED

ERROR IN NUMBER OF APPEARING PEOPLE MINIMIZED

Fig. 9

VISITOR NUMBER DATA

| index | OBSERVATION TIME | OBSERVATION (NUMBER OF VISITORS) $S_j$ | | |
|---|---|---|---|---|
| | $\Delta T = 10$ MINUTES | $S_1$ | $S_2$ | $S_3$ |
| 0 | 8:00 | 15 | 20 | 50 |
| 1 | 8:10 | 20 | 150 | 160 |
| 2 | 8:20 | 30 | 210 | 30 |
| 3 | 8:30 | 10 | 90 | 110 |
| ... | ... | ... | ... | ... |

VISITOR NUMBER VARIATION

| index | OBSERVATION TIME SLOT | OBSERVATION (NUMBER OF VISITORS) $S_j$ | | |
|---|---|---|---|---|
| | $\Delta T = 10$ MINUTES | $\Delta S_1$ | $\Delta S_2$ | $\Delta S_3$ |
| 0 | – | – | – | – |
| 1 | [8:00–8:10] | 5 | 130 | 110 |
| 2 | [8:10–8:20] | 10 | 60 | −130 |
| 3 | [8:20–8:30] | −20 | −120 | 80 |
| ... | ... | ... | ... | ... |

ESTIMATION APPARATUS, ESTIMATION METHOD AND PROGRAM

TECHNICAL FIELD

The present invention relates to an estimation device, an estimation method, and a program.

BACKGROUND ART

Strategies for ascertaining and controlling a flow of people in order to deal with the congestion that may occur at a large-scale event or the like are conventionally formulated and so on using a multi-agent simulator (MAS). In order to more accurately formulate strategies for ascertaining and effectively controlling a flow of people and so on, a highly precise simulation is required. A technique for determining parameters used to reproduce observation data on the basis of the observation data is essential for this purpose. Examples of such parameters include a parameter indicating a number of people passing along a travel route.

Here, for example, communication traffic estimation techniques employed in the field of communications are available as techniques that solve a similar problem to a technique for estimating a number of people passing along each travel route from numbers of people observed at a plurality of observation points (PTL 1 and NPL 1, for example). In a communication traffic estimation technique employed in a communication network, a communication volume between each pair of nodes is estimated from a volume of outgoing communication traffic and a volume of incoming communication traffic in each node, a volume of traffic on each link, and route information.

When a technique for estimating communication traffic is applied to the problem of estimating the movement of physical traffic, it may be impossible to observe the same person at a plurality of observation points within the same time slot since the movement of physical traffic, in contrast to communication, depends on the duration of the movement. If it is assumed that the volume of traffic within the subject time slot remains steady, however, the problem of estimating the movement of physical traffic may be regarded as posing similar questions to a technique for estimating communication traffic in the field of communications.

CITATION LIST

Patent Literature

[PTL 1] Japanese Patent Publication No. 5060513

Non Patent Literature

[NPL 1] Zhang Y. et al, "Fast Accurate Computation of Large-Scale IP Traffic Matrices from Link Loads", SIGMETRICS '03, pp. 206-217, 2003.

SUMMARY OF THE INVENTION

Technical Problem

Incidentally, in a communication traffic estimation technique, it is assumed that traffic flows only along a route designed by a designer, for example. In order to estimate the movement of by physical traffic, on the other hand, it is necessary to also estimate route candidates selected by a moving object (a person, a car, a motorbike, a bicycle, or the like, for example). Using conventional techniques, however, it is impossible to model an estimation of route candidates in this manner.

Moreover, to implement a highly precise simulation, data acquired by actually observing the traffic volume are required, but when the traffic volume is measured using a tally counter or the like, for example, there may be time slots during which the traffic volume could not be measured. In other words, some of the observation value data acquired by observing the traffic volume may be missing.

The present invention has been designed in consideration of the points discussed above, and an object thereof is to estimate a volume of traffic on each route from incomplete observation value data.

Means for Solving the Problem

For this purpose, an estimation device according to an embodiment of the present invention includes:

route generating means for generating a plurality of routes from an origin to a destination of a moving object on the basis of input road network data;

routing matrix generating means for generating, on the basis of the plurality of routes generated by the route generating means and a plurality of first observation points at each of which a traffic volume of the moving object is observed, a routing matrix expressing whether or not a moving object traveling along each of the plurality of routes is observed at each of the plurality of first observation points;

visitor matrix generating means for generating, on the basis of the plurality of routes generated by the route generating means and a plurality of second observation points at each of which a visitor volume of the moving object is observed, a visitor matrix expressing whether or not a moving object traveling along each of the plurality of routes departs from or arrives at each of the plurality of second observation points; and route-specific traffic volume estimating means for estimating the traffic volume of the moving object on each of the plurality of routes on the basis of the routing matrix generated by the routing matrix generating means, the visitor matrix generated by the visitor matrix generating means, first observation value data indicating the traffic volume of the moving object observed at each of the plurality of first observation points, and second observation value data indicating the visitor volume of the moving object observed at each of the plurality of second observation points.

Effects of the Invention

A volume of traffic on each route can be estimated from incomplete observation value data.

DESCRIPTION OF EMBODIMENTS

An embodiment of the present invention will be described below with reference to the figures. A route-specific person number estimation device 10 for estimating a number of people on each route as an example of a route-specific traffic volume will be described below. Note, however, that the route-specific traffic volume is not limited to the number of people on each route. For example, a number of cars on each route, a number of motorbikes on each route, a number of bicycles on each route, a number of living things on each route, and so on may be used as the route-specific traffic volume. Accordingly, the route-specific person number estimation device 10 according to this embodiment of the present invention may be applied in a similar manner to cases in which these route-specific traffic volumes are estimated. Note that a moving object such as a person, a car, a motorbike, a bicycle, or a living thing traveling along a route may also be referred to as an "agent".

<Configuration of Route-Specific Person Number Estimation Device 10>

Figure 1:
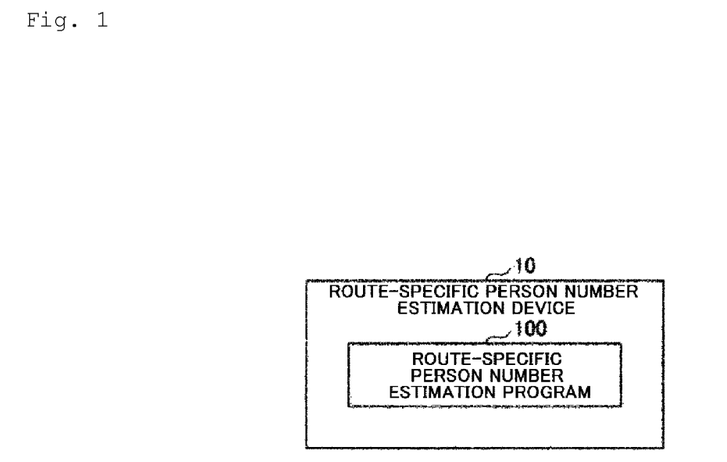
FIG. 1 is a view showing an example configuration of a route-specific person number estimation device according to an embodiment of the present invention.

First, the configuration of the route-specific person number estimation device 10 according to this embodiment of the present invention will be described with reference to FIG. 1. FIG. 1 is a view showing an example configuration of the route-specific person number estimation device 10 according to this embodiment of the present invention.

The route-specific person number estimation device 10 shown in FIG. 1 is a computer or a computer system that generates route candidates along which the agent may pass (also referred to simply as "route candidates" hereafter) and then estimates the number of people on each route (also referred to simply as the "route-specific person number" hereafter) from observation value data and so on. A route-specific person number estimation program 100 is installed in the route-specific person number estimation device 10 shown in FIG. 1. The route-specific person number estimation program 100 may be either a single program or a group of programs constituted by a plurality of programs or modules.

The route-specific person number estimation device 10 shown in FIG. 1 generates the route candidates and estimates the number of people on each route by means of processing executed by the route-specific person number estimation program 100.

Definitions of Variables

Here, variables used in this embodiment of the present invention are defined as follows.

$X_{t,i}$: an estimated value of the number of people on each route.

t: an index indicating a time. t is set at $0 \le t \le T$.

T: the final time of a time slot set as an observation target.

$R_i$: a route candidate (a string of nodes along which the agent may pass).

i: an index of the route candidate. i is set at $1 \le i \le I$.

I: the number of route candidates.

$Y_{t,j}$: an observation value of the number of passers-by passing each passer-by number observation point.

$S_{t,j'}$: an observation value of the number of visitors visiting each visitor number observation point.

ΔS: variation in the number of visitors.

$M_j$: a passer-by number observation point (a string of nodes set as an observation target).

M: a list of passer-by number observation points.

$M'_{j'}$: a visitor number observation point (a node set as an observation target).

M': a list of visitor number observation points.

j: an index of the passer-by number observation point. j is set at $1 \le j \le J$.

j': an index of the visitor number observation point. j' is set at $1 \le j' \le J'$.

J: the number of passer-by number observation points.

J': the number of visitor number observation points.

A: a routing matrix.

B: a visitor matrix.

Here, a T-row, J-column matrix on which numbers of people $Y_{t,j}$ at respective passer-by number observation points are set as elements is represented by observation value data Y. The observation value data Y are data acquired by temporally and spatially measuring and tallying traffic volumes at a certain granularity. A method of measuring a traffic volume by counting the number of cars or people moving along a road, as disclosed by the Ministry of Land, Infrastructure, Transport, and Tourism in "Road Traffic Census 2015, Outline of Results of General Traffic Volume Survey", for example, may be used as a method of acquiring the observation value data Y.

Figure 2:
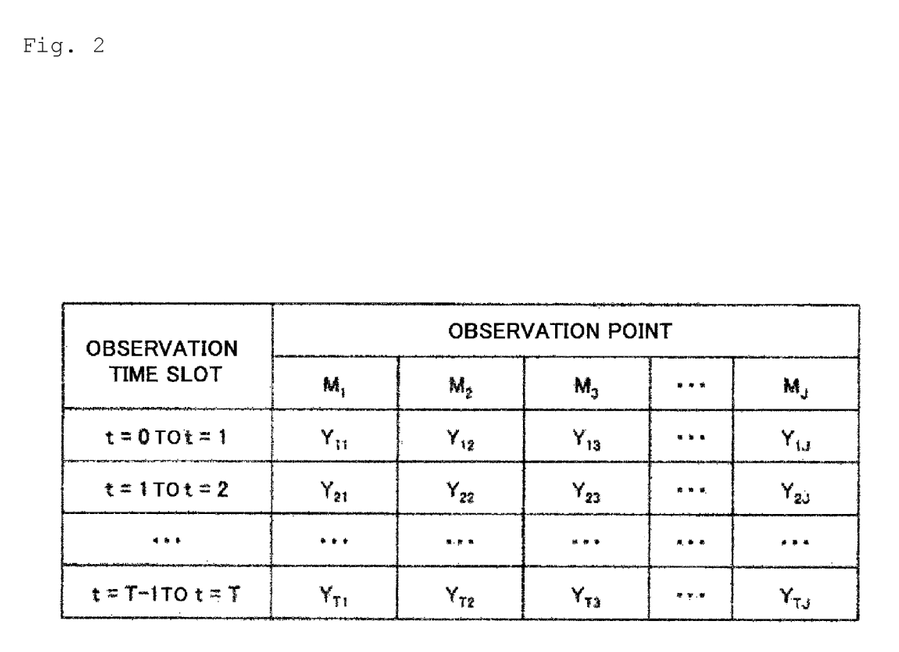
FIG. 2 is a view showing an example of observation value data.

FIG. 2 shows an example of the observation value data Y. As shown in FIG. 2, in the observation value data Y, observation values $Y_{1,j}$ (j=1, 2, ..., J) observed at respective observation points $M_j$ (j=1, 2, ..., J) over an observation time slot (an observation period) t=0 to t=1 are set as the elements of a (1, j) component. Similarly, in the observation value data Y, observation values $Y_{2,j}$ (j=1, 2, ..., J) observed at the respective observation points $M_j$ (j=1, 2, ..., J) over an observation time slot t=1 to t=2 are set as the elements of a (2, j) component. Likewise thereafter, in the observation value data Y, observation values $Y_{T,j}$ (j=1, 2, ..., J) observed at the respective observation points $M_j$ (j=1, 2, ..., J) over an observation time slot t=T−1 to t=T are set as the elements of a (T, j) component.

A missing value may exist in the observation values $Y_{t,j}$ included in the observation value data Y. In other words, a missing measurement may exist at a certain observation point $M_j$ in a certain observation time slot. Either NULL or a predetermined value determined in advance (a predetermined code value indicating a missing value, a value that cannot be acquired as an observation value, or the like, for example) may be set as the missing observation value $Y_{t,j}$.

Note that the observation periods may have different time widths. For example, the time width of the observation period t=0 to t=1 may differ from the time width of the observation period t=1 to t=2. Further, observation may be performed over a different time width at each observation point $M_j$. For example, over the period from t=0 to t=T, T observations may be performed at the observation point $M_1$ while T/2 observations are performed at the observation point $M_2$, and so on. In other words, the observation period may differ at each observation point $M_j$. In this case, observation points $M_j$ having aligned observation time widths (i.e., observation points $M_j$ having identical observation periods) may be grouped together so that the observation value data Y are expressed by a plurality of matrices.

Furthermore, a T-row, J'-column matrix on which numbers of visitors $S_{t,j'}$ at respective visitor number observation points are set as elements is represented by observation value data S. Similarly to Y, S may have missing values.

<Hardware Configuration of Route-Specific Person Number Estimation Device 10>

Figure 3:
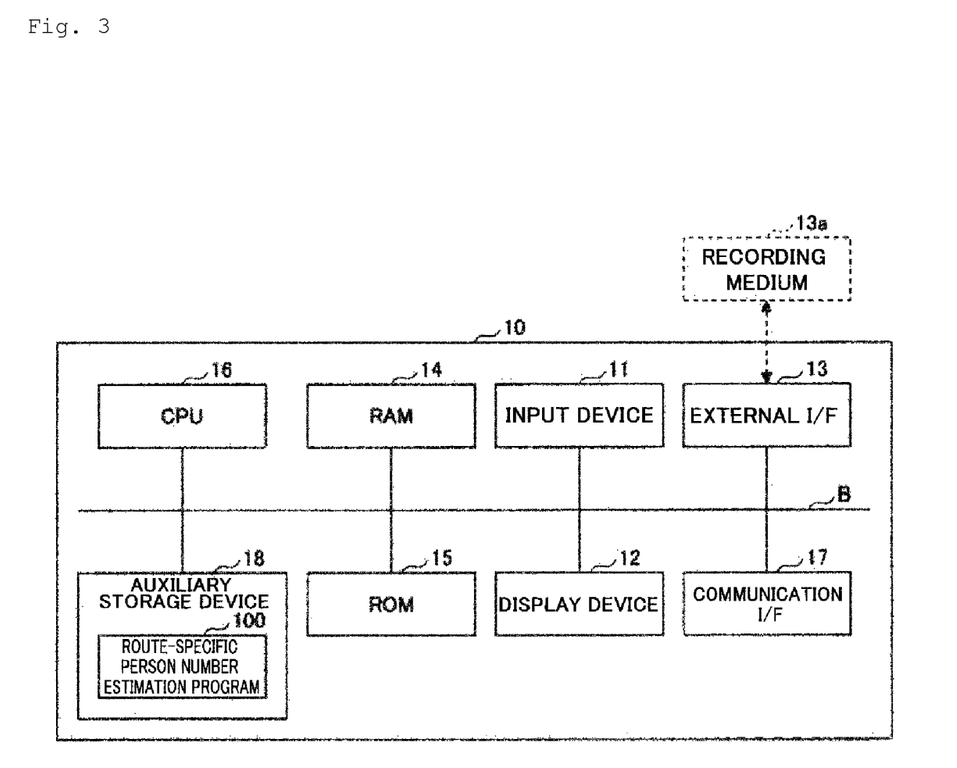
FIG. 3 is a view showing an example hardware configuration of the route-specific person number estimation device according to this embodiment of the present invention.

Next, a hardware configuration of the route-specific person number estimation device 10 according to this embodiment of the present invention will be described with reference to FIG. 3. FIG. 3 is a view showing an example hardware configuration of the route-specific person number estimation device 10 according to this embodiment of the present invention.

The route-specific person number estimation device 10 shown in FIG. 3 includes an input device 11, a display device 12, an external I/F 13, a RAM (Random Access Memory) 14, a ROM (Read Only Memory) 15, a CPU (Central Processing Unit) 16, a communication I/F 17, and an auxiliary storage device 18. These pieces of hardware are connected communicably via a bus B.

The input device 11 is a keyboard, a mouse, a touch panel, or the like, for example, and is used by a user to input various operations. The display device 12 is a display or the like, for example, that displays processing results acquired by the route-specific person number estimation device 10. Note that the route-specific person number estimation device 10 does not have to include at least one of the input device 11 and the display device 12.

The external I/F 13 is an interface to an external device. The external device is a recording medium 13a or the like. The route-specific person number estimation device 10 can perform reading and writing to and from the recording medium 13a and so on via the external I/F 13. The route-specific person number estimation program 100 and so on may be recorded on the recording medium 13a.

The recording medium 13a may be a flexible disc, a CD (Compact Disc), a DVD (Digital Versatile Disc), an SD memory card (Secure Digital memory card), a USB (Universal Serial Bus) memory card, or the like, for example.

The RAM 14 is a volatile semiconductor memory for temporarily storing programs and data. The ROM 15 is a nonvolatile semiconductor memory that can store programs and data even when the power supply thereof is cut off. OS settings, network settings, and so on, for example, are stored in the ROM 15.

The CPU 16 is a computation device that executed processing by reading programs and data from the ROM 15, the auxiliary storage device 18, and so on to the RAM 14.

The communication I/F 17 is an interface for connecting the route-specific person number estimation device 10 to a communication network. The route-specific person number estimation program 100 may be acquired (downloaded) from a predetermined server device or the like via the communication I/F 17.

The auxiliary storage device 18 is a nonvolatile storage device such as an HDD (Hard Disk Drive) or an SSD (Solid State Drive), for example, that stores programs and data. The programs and data stored in the auxiliary storage device 18 include an OS, an application program for realizing various functions on the OS, the route-specific person number estimation program 100, and so on, for example.

By having the hardware configuration shown in FIG. 3, the route-specific person number estimation device 10 according to this embodiment of the present invention can realize various types of processing described below.

<Functional Configuration of Route-Specific Person Number Estimation Device 10>

Figure 4:
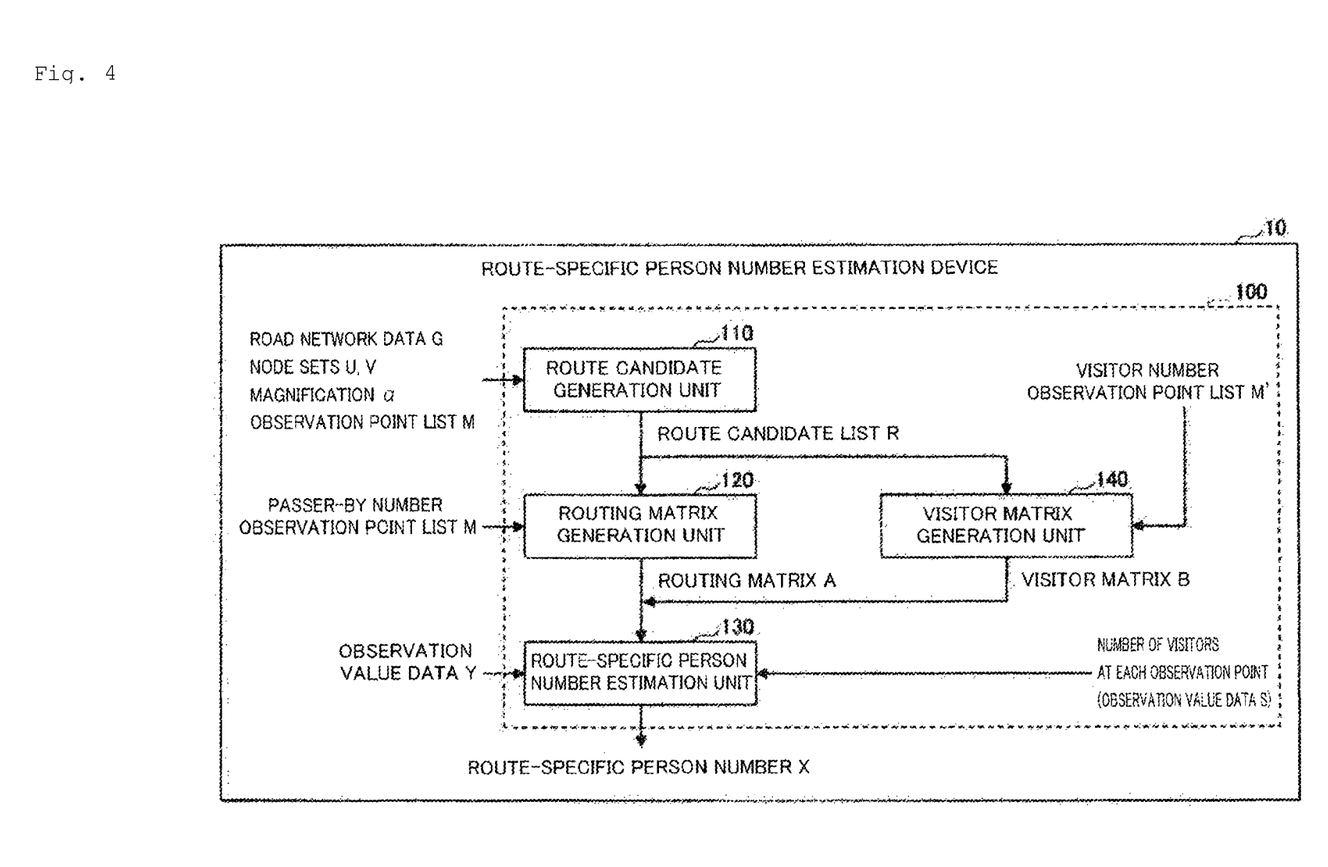
FIG. 4 is a view showing an example functional configuration of the route-specific person number estimation device according to this embodiment of the present invention.

Next, a functional configuration of the route-specific person number estimation device 10 according to this embodiment of the present invention will be described with reference to FIG. 4. FIG. 4 is a view showing an example functional configuration of the route-specific person number estimation device 10 according to this embodiment of the present invention.

The route-specific person number estimation device 10 shown in FIG. 4 includes a route candidate generation unit 110, a routing matrix generation unit 120, a route-specific person number estimation unit 130, and a visitor matrix generation unit 140. Each of these units is realized by processing that the route-specific person number estimation program 100 causes the CPU 16 to execute.

The route candidate generation unit 110 generates a route candidate list R upon receipt of road network data G, node sets V and U, a magnification α, and a passer-by number observation point list M. The route candidate list R is a list of route candidates $R_i$. Each route candidate $R_i$ is a string of linked nodes within the road network data G.

Note that the route candidate generation unit 110 does not have to receive at least one element among the node sets V and U, the magnification α, and the passer-by number observation point list M. In other words, the node sets V and U, the magnification α, and the passer-by number observation point list M are optional input data.

The road network data G are constituted by a directed graph representing a target road network. The road network data G are expressed as G={N, E}, where N represents a set of nodes (intersections and the like, for example) belonging to the road network and E represents a set of links (roads and the like, for example) belonging to the road network.

The node sets V and U are sets of nodes used to limit combinations of an origin (O) and a destination (D) (referred to hereafter as "OD combinations"). Each OD combination is a combination of a node serving as the origin and a node serving as the destination.

Nodes denoting landmarks (for example, nodes where people may appear or disappear) may be used as the nodes included in the node sets V and U. More specifically, a set of nodes denoting stations, for example, may be used as the node set V. Further, a set of nodes denoting entrances to event venues, for example, may be used as the node set U.

The magnification α is a value used to limit the allowable range of the length of the route candidates $R_i$. The value of the magnification α is set in advance by the user of the route-specific person number estimation device 10 or the like, for example.

The passer-by number observation point list M is a list of passer-by number observation points $M_j$, and is used to exclude route candidates $R_i$ that are not observed at any of the passer-by number observation points $M_j$.

The routing matrix generation unit 120 generates a routing matrix A upon receipt of the route candidate list R and the passer-by number observation point list M.

The visitor matrix generation unit 140 generates a visitor matrix B upon receipt of the route candidate list R and a visitor number observation point list M'.

The route-specific person number estimation unit 130 estimates a route-specific person number X upon receipt of the routing matrix A, the visitor matrix B, the observation value data Y, and the observation value data S. The route-specific person number estimation unit 130 then outputs the estimated route-specific person number X. The route-specific person number X is a matrix expressing the volume of traffic on each route. Note that the route-specific person number estimation unit 130 may output the route-specific person number X to a desired output destination set in advance. For example, the route-specific person number estimation unit 130 may output the route-specific person number X to the display device 12, output (store) the route-specific person number X to (in) the auxiliary storage device 18, the recording medium 13a, or the like, or output (transmit) the route-specific person number X to a server device or the like on a network via the communication I/F 17. The route-specific person number estimation unit 130 may also output the route-specific person number X to another program (a people flow simulation program, for example).

<Processing Executed by Route-Specific Person Number Estimation Device 10>

Figure 5:
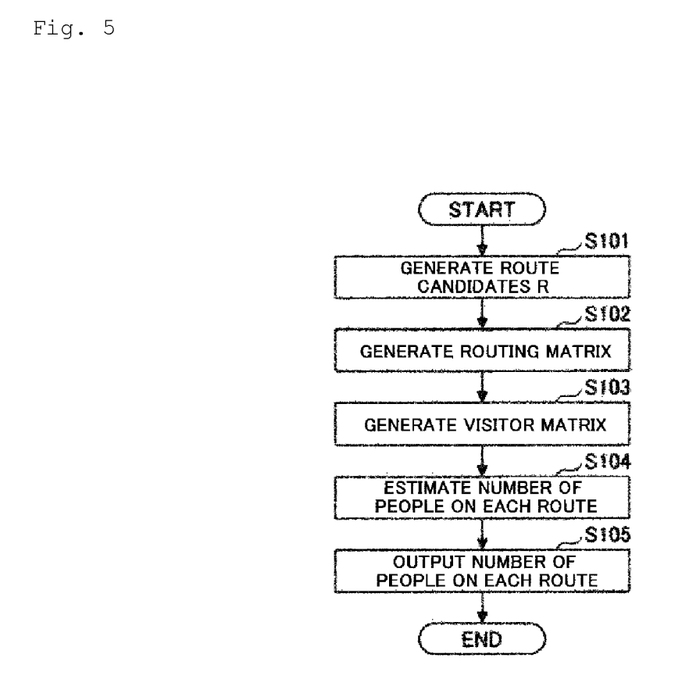
FIG. 5 is a flowchart showing an example of processing executed by the route-specific person number estimation device according to this embodiment of the present invention.

Next, processing executed by the route-specific person number estimation device 10 according to this embodiment of the present invention will be described with reference to FIG. 5. FIG. 5 is a flowchart showing an example of the processing executed by the route-specific person number estimation device according to this embodiment of the present invention.

Step S101: The route candidate generation unit 110 generates the route candidate list R by executing following procedures (1) to (4) on all OD combinations. When the node sets V and U are not input, the route candidate generation unit 110 creates OD combinations from the nodes included in the road network data G. When the node sets V and U are input, on the other hand, the route candidate generation unit 110 creates OD combinations from the nodes included in the node set V and the nodes included in the node set U. Creating OD combinations from the nodes included in the node set V and the nodes included in the node set U corresponds to selecting respective edges of a complete bipartite graph of the node set V and the node set U.

Note that the nodes included in the road network data G, the nodes included in the node set V, and the nodes included in the node set U can all be either an origin (O) or a destination (D). In other words, an OD combination of a node $N_1$ and a node $N_2$ included in the road network data G may be either a combination in which the node $N_1$ is the origin and the node $N_2$ is the destination or a combination in which the node $N_2$ is the origin and the node $N_1$ is the destination. Similarly with respect to the node sets V and U, an OD combination of a node $N_1$ included in the node set V and a node $N_2$ included in the node set U may be either a combination in which the node Ni is the origin and the node $N_2$ is the destination or a combination in which the node $N_2$ is the origin and the node $N_1$ is the destination.

(1) The route candidate generation unit 110 enumerates all of the routes between the node (referred to hereafter as the "node O") indicating the origin (O) included in the OD combination and the node (referred to hereafter as the "node D") indicating the destination (D) included in the OD combination. The enumerated routes respectively serve as the route candidates $R_i$.

Enumerating all of the routes between the node O and the node D can be realized using Graphillion, for example. Graphillion is disclosed in "A New Approach to the Problem of Combinations using a Super-Fast Graph Enumeration Algorithm (How to Count Miracles)", ERATO Minato Discrete Structure Manipulation System Project (author), Shin-ichi MINATO (editor), Morikita Publishing, 2015, for example.

(2) The route candidate generation unit 110 retrieves the shortest route between the node O and the node D using a shortest route search algorithm, and computes the distance of the retrieved shortest route. NetworkX, which is a Python library, or the like can be used for this purpose.

(3) Next, the route candidate generation unit 110 compares the distance (the route candidate distance $d_i$) of each of the route candidates $R_i$ acquired in (1) with the distance (the shortest distance $d_{min}$) of the shortest route acquired in (2). The route candidate generation unit 110 then excludes the route candidates $R_i$ whose route candidate distance $d_i$ equals or exceeds α times the shortest distance $d_{min}$ from the route candidates $R_i$.

(4) Next, the route candidate generation unit 110 excludes unobserved route candidates $R_i$ from the route candidates $R_i$ acquired in (3). Whether or not a route candidate $R_i$ is observed can be determined using the passer-by number observation point list M.

More specifically, for example, it is assumed that the passer-by number observation points $M_j$ included on the passer-by number observation point list M are set as $M_j$=$[M_{j,\ 1}, M_{j,\ 2}, \ldots, M_{j,\ n}]$ and the route candidate $R_i$ is set as $R_i$=$[R_{i,\ 1}, R_{i,\ 2}, \ldots, R_{i,\ k}]$. Here, n is the number of nodes included in the observation points $M_j$ and k is the number of nodes included in the route candidate $R_i$. When, at this time, one of the nodes $R_{i,\ 1}, R_{i,\ 2}, \ldots, R_{i,\ k}$ is the same node as one of the nodes $M_{j,\ 1}, M_{j,\ 2}, \ldots, M_{j,\ n}$, it is determined that the route candidate $R_i$ is observed. When, on the other hand, none of the nodes $R_{i,\ 1}, R_{i,\ 2}, \ldots, R_{i,\ k}$ is the same node as any of the nodes $M_{j,\ 1}, M_{j,\ 2}, \ldots, M_{j,\ n}$, it is determined that the route candidate $R_i$ is unobserved.

As a specific example, when the first node $R_{i,\ 1}$ of the route candidate $R_i$ is the same node as one of the nodes $M_{j,\ 1}, M_{j,\ 2}, \ldots, M_{j,\ n}$, departure on the route candidate $R_i$ is observed. Similarly, when the last node $R_{i,\ k}$ of the route candidate $R_i$ is the same node as one of the nodes $M_{j,\ 1}, M_{j,\ 2}, \ldots, M_{j,\ n}$, arrival on the route candidate $R_i$ is observed. In addition, when the passer-by number observation points $M_j$ are a substring of the route candidate $R_i$, passage along the route candidate $R_i$ is observed.

A list of the route candidates $R_i$ acquired in (4) from all of the OD combinations serves as the route candidate list R. The route candidate generation unit 110 outputs the acquired route candidate list R to the routing matrix generation unit 120.

As noted above, at least one element among the node sets V and U, the magnification α, and the passer-by number observation point list M does not have to be input into the route candidate generation unit 110. Depending on the size of the road network data G, however, the number of route candidates $R_i$ included on the route candidate list R may become extremely large. Therefore, the route candidates $R_i$ are preferably limited using at least one element among the node sets V and U, the magnification α, and the passer-by number observation point list M.

Step S102: The routing matrix generation unit 120 generates a routing matrix A from the route candidate list R and the passer-by number observation point list M. When the elements of the routing matrix A are set as $A_{j,\ i}$, the routing matrix A is generated using Formula 1 below.

[Formula 1]

$$A_{j,i} = \begin{cases} 1 & \text{(when a person on a route candidate } R_i \text{ is observed at the observation points } M_j\text{)} \\ 0 & \text{(when a person on a route candidate } R_i \text{ is not observed at the observation points } M_j\text{)} \end{cases} \quad \text{Formula 1}$$

In other words, the routing matrix A is generated such that when a route candidate $R_i$ is observed at the passer-by number observation points $M_j$, the (j, i) element $A_{j,i}$ of the routing matrix is set at 1, and when this is not the case, $A_{j,i}$ is set at 0.

Whether or not a route candidate $R_i$ is observed at the passer-by number observation points $M_j$ is determined in the following manner, for example. The route candidate $R_i$ is set as $R_i=[R_{i,1}, R_{i,2}, \ldots, R_{i,k}]$. Here, k is the number of nodes included in the route candidate $R_i$. The passer-by number observation points $M_j$ included on the passer-by number observation point list M are set as $M_j=[M_{j,1}, M_{j,2}, \ldots, M_{j,n}]$. Here, n is the number of nodes included in the passer-by number observation points $M_j$. Each passer-by number observation point $M_j$ has one property among "departure", "arrival", and "passage". When the property is "departure", the route candidate $R_i$ is observed if the first element (the first node) $R_{i,1}$ thereof is included in the passer-by number observation points $M_j$ and not observed if not. When the property is "arrival", the route candidate $R_i$ is observed if the last element $R_{i,k}$ thereof is included in the passer-by number observation points $M_j$ and not observed if not. When the property is "passage", the route candidate $R_i$ is observed if at least a part thereof is included in the passer-by number observation points $M_j$ and not observed if not. Thus, assuming that passer-by number observation points $M_j$ having at least one property among "departure", "arrival", and "passage" are included on the passer-by number observation point list M, whether or not the route candidates $R_i$ are observed at the passer-by number observation points $M_j$ is determined in accordance with the respective properties, whereupon the values of the (j, i) elements $A_{j,i}$ of the routing matrix are set.

Each element of the routing matrix A generated in this manner expresses whether or not a moving object (a person, a car, a motorbike, bicycle, or the like, for example) traveling along each of a plurality of routes is observed at each of a plurality of passer-by number observation points. In other words, $A_{j,i}$ expresses whether or not a moving object traveling along the route candidates $R_i$ can be observed at the passer-by number observation points $M_j$. As a result, when estimating the numbers of moving objects traveling along the route candidates $R_i$, the elements of the observation value data Y that should be taken into account can be specified from the routing matrix A.

Step S103: The visitor matrix generation unit 140 generates a visitor matrix B from the route candidate list R and the visitor number observation point list M'. When the respective elements of the visitor matrix B are set as $B_{j',i}$, the visitor matrix B is generated using Formula 2 shown in FIG. 6.

Figure 6:
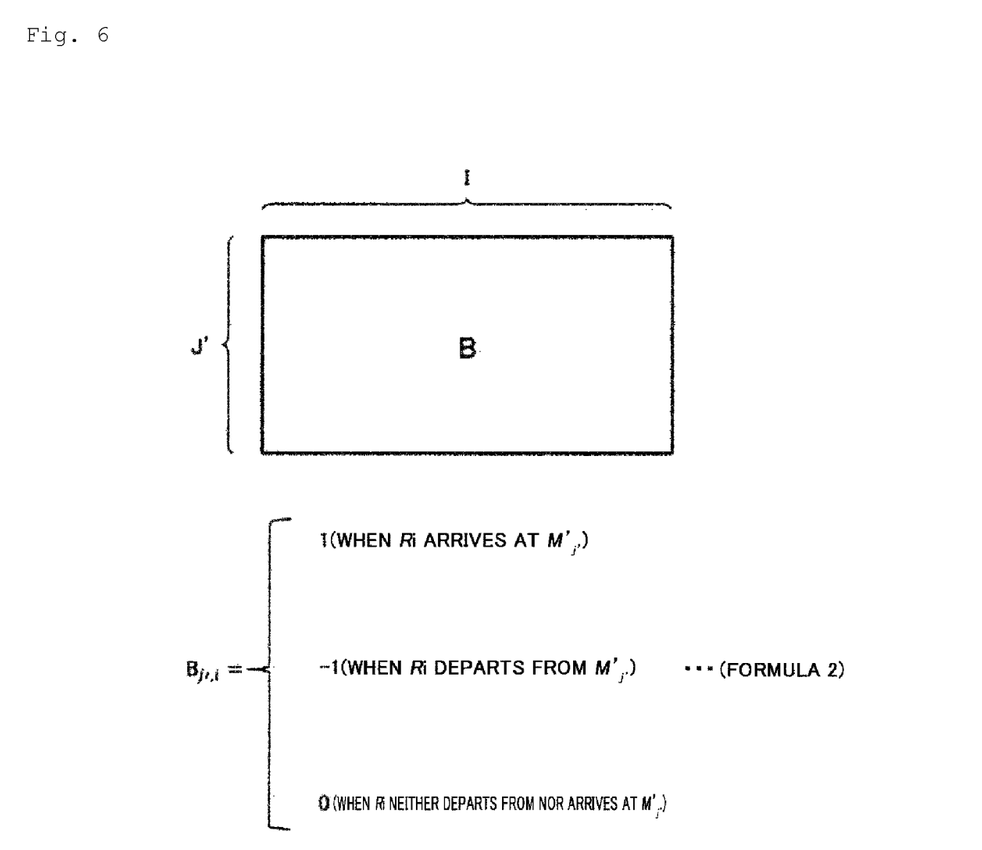
FIG. 6 is a view illustrating processing executed by a visitor matrix generation unit.

More specifically, the visitor matrix B is generated such that when a moving object on the route candidate $R_i$ arrives at a visitor number observation point $M'_{j'}$, the (j', i) element $B_{j',i}$ of the visitor matrix B is set at 1, when a moving object on the route candidate $R_i$ departs from the visitor number observation point $M'_{j'}$, the (j', i) element $B_{j',i}$ of the visitor matrix B is set at -1, and in neither of these cases, $B_{j',i}$ is set at 0.

Whether a moving object on the route candidate $R_i$ arrives at or departs from the visitor number observation point $M'_{j'}$ is determined as follows, for example. The route candidate $R_i$ is set as $R_i=[R_{i,1}, R_{i,2}, \ldots, R_{i,k}]$. Here, k is the number of nodes included in the route candidate $R_i$. The visitor number observation point list M' is set as $M'=[M'_1, M'_2, \ldots M'_{j'}, \ldots, M'_{J'}]$. Here, $_{J'}$ is the number of nodes included on the visitor number observation point list M'. $M'_{j'}$ is an element of the set of nodes constituting the route.

Figure 7:
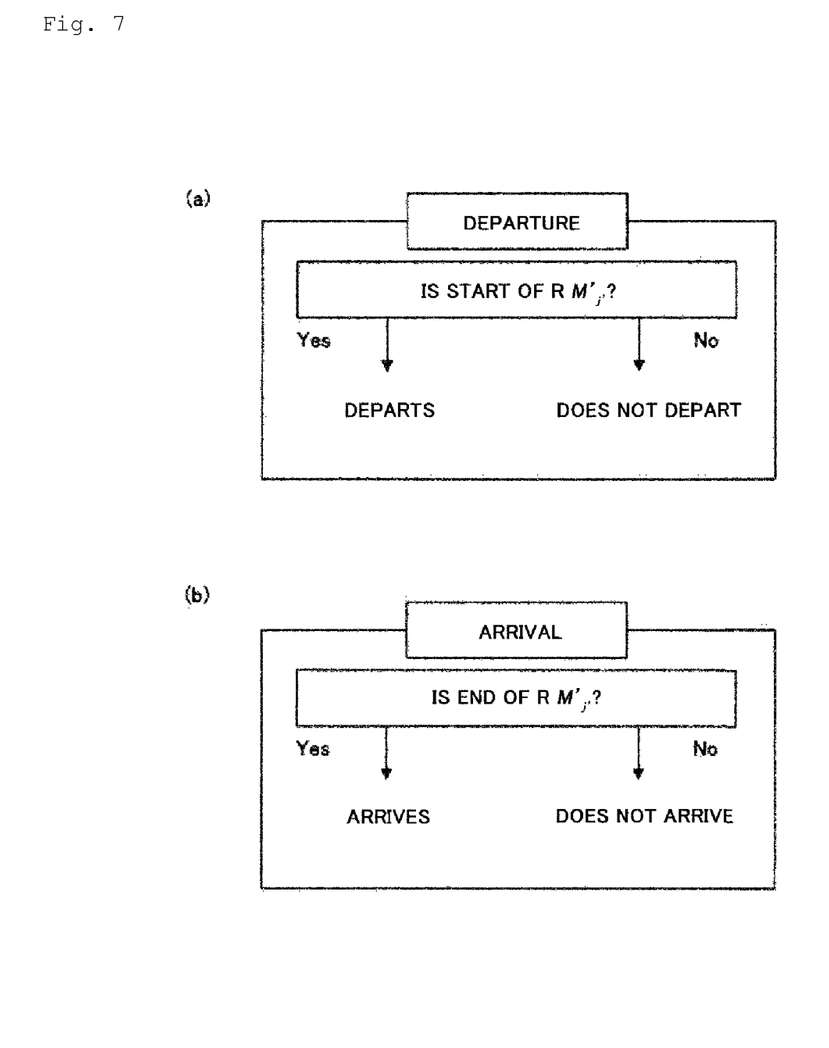
FIG. 7 is a view illustrating a departure/arrival determination performed at an observation point on a route.

As shown in FIG. 7A, if the first element (the first node) $R_{i,1}$ of the route candidate $R_i$ is the visitor number observation point $M'_{j'}$, it is determined that the moving object on the route candidate $R_i$ departs from the visitor number observation point $M'_{j'}$. As shown in FIG. 7B, if the last element (the last node) $R_{i,k}$ of the route candidate $R_i$ is the visitor number observation point $M'_{j'}$, it is determined that the moving object on the route candidate $R_i$ arrives at the visitor number observation point $M'_{j'}$. In neither of these cases, it is determined that the moving object on the route candidate $R_i$ neither departs from nor arrives at the visitor number observation point $M'_{j'}$.

Each element of the visitor matrix B generated in this manner expresses whether a moving object (a person, a car, a motorbike, bicycle, or the like, for example) traveling along each of a plurality of routes arrives at, departs from, or neither arrives at nor departs from each of a plurality of visitor number observation points. As a result, when estimating the numbers of moving objects traveling along the route candidates $R_i$, the estimation can be performed in consideration of variation in the number of visitors.

Step S104: The route-specific person number estimation unit 130 estimates the route-specific person number X by solving the problem of minimizing an objective function Obj expressed by Formula 3 in FIG. 8. $\Delta S_{t,j'}$ in Formula 3 represents variation in the number of visitors visiting the visitor number observation point $M'_{j'}$ at a time t, and when the observation data of the number of visitors visiting the visitor number observation point $M'_{j'}$ at the time t are set as $S_{t,j'}$, $\Delta S_{t,j'} = S_{t,j'} - S_{t-1,j'}$.

Figure 8:
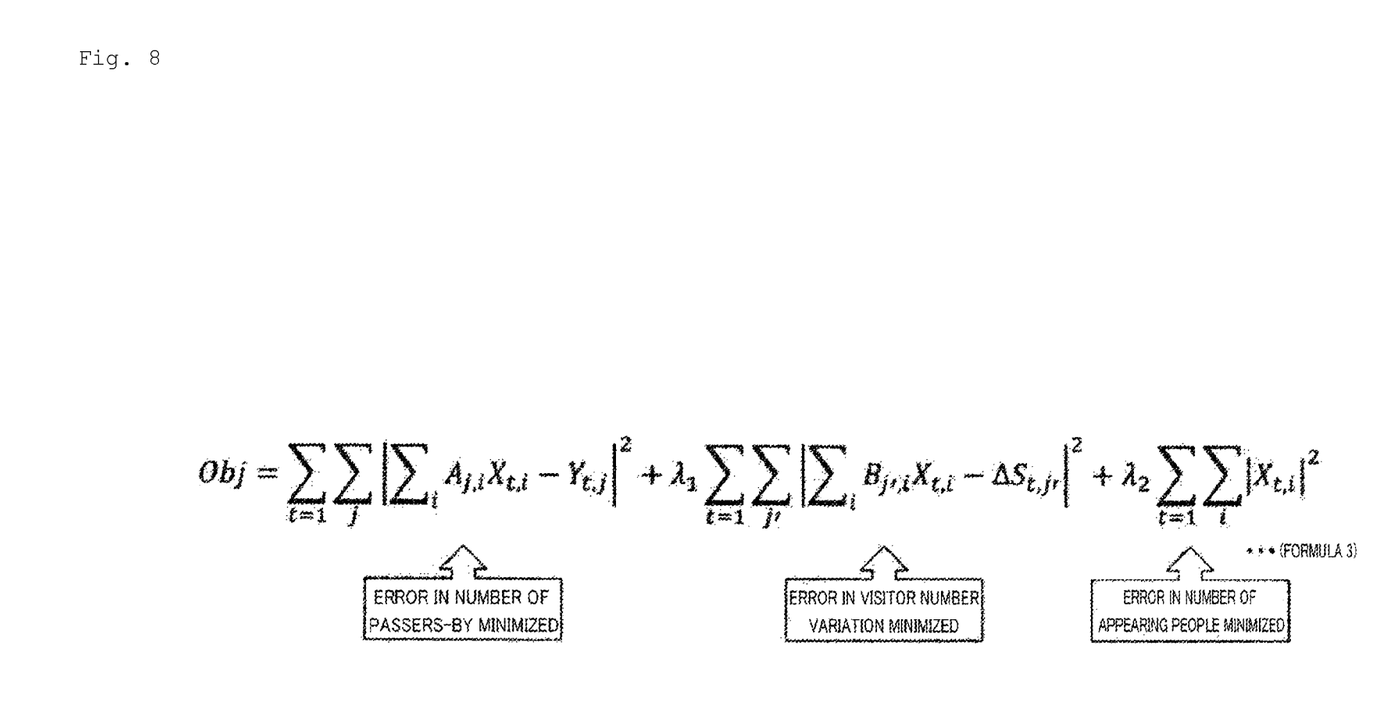
FIG. 8 is a view showing an objective function used by a route-specific person number estimation unit.

Note that since a number of people is a non-negative, the objective function Obj is minimized so as to satisfy a limiting condition $X_{t,i} \geq 0$. The (t, i) element of X is an estimation result of the number of people passing along the route $R_i$ at the time t. Parameters $\lambda_1$, $\lambda_2$ of the objective function Obj are determined in consideration of errors in the number of passers-by and the number of visitors and are stored in advance in the route-specific person number estimation unit 130.

A trust region reflective method algorithm or the like, for example, may be used as a method of determining X for minimizing Formula 3. A trust region reflective method algorithm is disclosed in Coleman, T. F. and Y. Li, "A Reflective Newton Method for Minimizing a Quadratic Function Subject to Bounds on Some of the Variables", SIAM Journal on Optimization, Vol. 6, Number 4, pp. 1040-1058, 1996, and so on, for example.

As shown in FIG. 8, the first term of the objective function Obj is a term for minimizing an error between the observed number of passers-by and the estimated number of passers-by. The second term is a term for minimizing an error between observed variation in the number of visitors and estimated variation in the number of visitors. The third term is a term for minimizing the number of appearing people (the volume of the moving object).

More specifically, regarding the second term, it is evident from $B_{j',i} X_{t,i}$ that when $B_{j',i}$ is 1, the number of people $X_{t,i}$ on the route i arrive at the corresponding node (the number of visitors increases). Further, when $B_{j',i}$ is −1, for example, this means that the number of people $X_{t,i}$ on the route i arrive at the corresponding node (the number of visitors decreases). In addition, when $B_{j',i}$ is 0, for example, this means that the number of people $X_{t,i}$ on the route i neither depart from or arrive at the corresponding node. In the second term, the number of people $X_{t,i}$ is determined in consideration of these points so as to minimize the error between the observed variation in the number of visitors and the estimated variation in the number of visitors.

Figure 9:
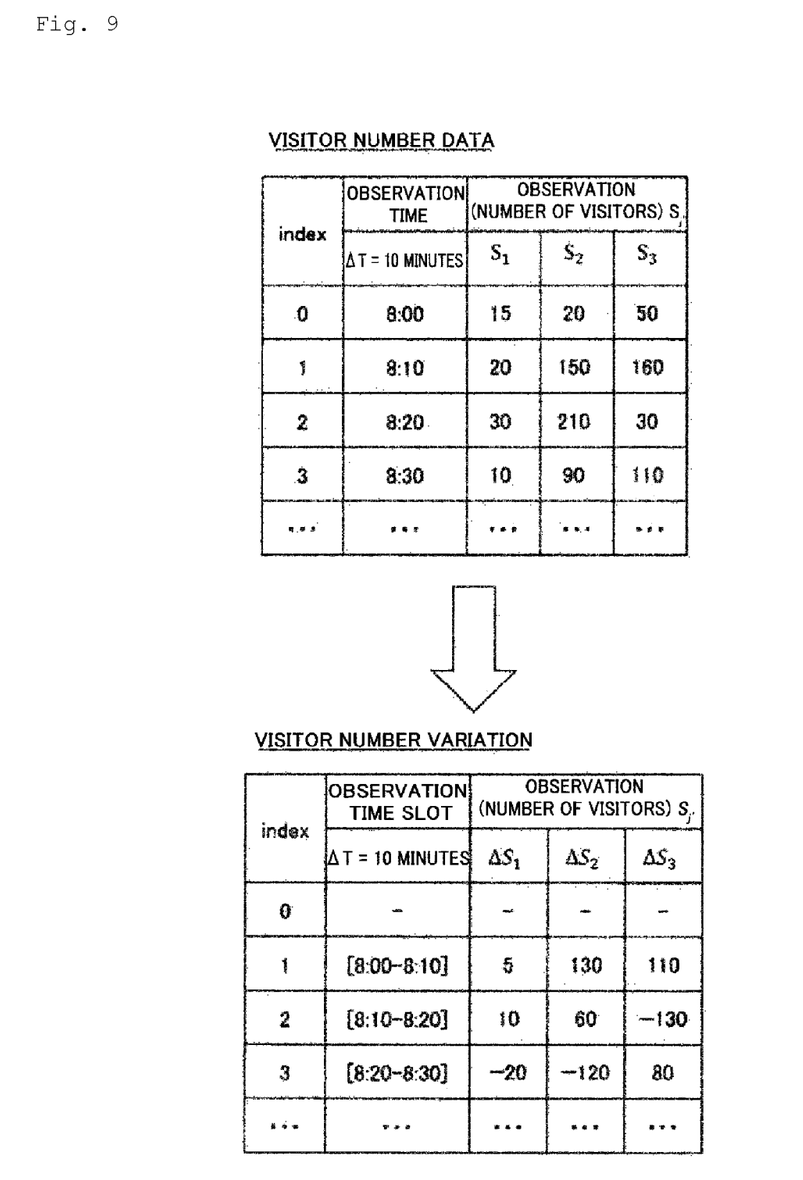
FIG. 9 is a view illustrating a method for computing variation in a number of visitors.

Here, an example of computation of $\Delta S_{t,j'}$ will be described with reference to FIG. 9. Note that index in FIG. 9 corresponds to the time t used heretofore. Further, in this example, a time interval $\Delta t$ is fixed at 10 minutes.

As shown in FIG. 9A, observation data (visitor number data) $S_1$, $S_2$, $S_3$ from visitor number observation points M'$_1$, M'$_2$, M'$_3$ are acquired at each time. As noted above, $\Delta S_{t,j'} = S_{t,j'} - S_{t-1,j'}$, and therefore $\Delta S_{j'}$ at each time is computed as shown in FIG. 9B.

For example, at the visitor number observation point M'$_1$, the number of visitors at a time t=1 is 20, and the number of visitors at a time t=2 is 30, and therefore $\Delta S_{2,1} = S_{2,1} - S_{1,1} = 30 - 20 = 10$.

Step S105: The route-specific person number estimation unit 130 outputs the route-specific person number X acquired in step S104.

As described above, the route-specific person number estimation device 10 according to this embodiment of the present invention can estimate and output the route-specific person number X from the observation value data Y. Moreover, the route-specific person number estimation device 10 according to this embodiment of the present invention can estimate the route-specific person number X even when a value is missing from the observation values included in the observation value data Y or the lengths of the observation periods of the observation values differ.

Furthermore, the route-specific person number estimation device 10 according to this embodiment of the present invention can estimate the route-specific person number X in consideration of the number of visitors. In other words, a route-specific person number conforming to both an observed number of passers-by and an observed number of visitors can be acquired.

By inputting the route-specific person number X acquired by the route-specific person number estimation device 10 according to this embodiment of the present invention into a people flow simulator, for example, temporal transitions in a flow of people can be reconstructed. The route-specific person number X may also be useful in ascertaining customer flows in the field of marketing, considering crowd surge strategies in the field of crowd security, and so on.

Summary of Embodiment

According to this embodiment, as described above, there is provided an estimation device including route generating means for generating a plurality of routes from an origin to a destination of a moving object on the basis of input road network data, routing matrix generating means for generating, on the basis of the plurality of routes generated by the route generating means and a plurality of first observation points at each of which a traffic volume of the moving object is observed, a routing matrix expressing whether or not a moving object traveling along each of the plurality of routes is observed at each of the plurality of first observation points, visitor matrix generating means for generating, on the basis of the plurality of routes generated by the route generating means and a plurality of second observation points at each of which a visitor volume of the moving object is observed, a visitor matrix expressing whether or not a moving object traveling along each of the plurality of routes departs from or arrives at each of the plurality of second observation points, and route-specific traffic volume estimating means for estimating the traffic volume of the moving object on each of the plurality of routes on the basis of the routing matrix generated by the routing matrix generating means, the visitor matrix generated by the visitor matrix generating means, first observation value data indicating the traffic volume of the moving object observed at each of the plurality of first observation points, and second observation value data indicating the visitor volume of the moving object observed at each of the plurality of second observation points.

When a certain second observation point is at the start of a certain route, the visitor matrix generating means determines that a moving object traveling along the route departs from the second observation point, and when a certain second observation point is at the end of a certain route, the visitor matrix generating means determines that a moving object traveling along the route arrives at the second observation point, for example.

The route-specific traffic volume estimating means estimates the traffic volume so as to minimize a sum of an error between the observed traffic volume and the estimated traffic volume, an error between observed variation in the visitor volume and estimated variation in the visitor volume, and an appearance volume of the moving object, for example.

The route generating means may select an origin and a destination respectively from a first set and a second set of nodes included in the road network data, predetermined first nodes being included in the first set and predetermined second nodes being included in the second set, and generate a plurality of routes from the selected origin to the selected destination.

The route generating means may compare a first distance, which is acquired by multiplying the distance of the shortest route from the origin to the destination by a predetermined value, with respective second distances of the plurality of routes, and exclude routes corresponding to second distances that equal or exceed the first distance from the plurality of routes.

The route generating means may exclude a route that is not observed at any of the plurality of first observation points from the plurality of routes.

The present invention is not limited to the specific embodiment disclosed above, and various alterations and modifications may be applied thereto without departing from the scope of the claims.

REFERENCE SIGNS LIST

10 Route-specific person number estimation device
100 Route-specific person number estimation program
110 Route candidate generation unit
120 Routing matrix generation unit
130 Route-specific person number estimation unit
140 Visitor matrix generation unit

The invention claimed is:

1. A computer-implemented method for estimating a traffic volume of moving objects, the method comprising:
receiving road network data;

generating, based on the received road network data, a plurality of routes from an origin to a destination of one or more of the moving objects;

generating, based on the generated plurality of routes and a first set of observation points for observing a set of traffic volume data of the moving objects, a routing matrix, wherein the routing matrix indicates whether or not the moving object traveling along each of the plurality of routes is observed at each of the first set of observation points;

generating, based on the generated plurality of routes and a second set of observation points for observing a set of visitor volume data of the moving objects, a visitor matrix, wherein the visitor matrix indicates whether or not the moving objects traveling along each of the plurality of routes departs from or arrives at one of the second set of observation points;

receiving the set of traffic volume data of the moving objects observed at each of the first set of observation points;

receiving the set of visitor volume data of the moving objects observed at each of the second set of observation points;

estimating the traffic volume of the moving objects on one or more routes of the plurality of routes based on:
the generated routing matrix,
the generated visitor matrix,
the received set of traffic volume data at the first set of observation points, and
the received set of traffic volume data at the second set of observation point, wherein the estimating further comprises estimating the traffic volume of the moving object by minimizing a sum of:
a first error between the received traffic volume data and the estimated traffic volume data,
a second error between a variation in the visitor volume data and an estimated variation in the visitor volume data, and
a number of the moving objects; and
displaying the estimated traffic volume on a display device.

2. The computer-implemented method of claim 1, wherein the one or more of the moving objects depart from a starting point of a route when a first observation point in the second set of observation points is at the starting point of the route, and wherein the one or more of the moving objects arrives at the starting point of the route when a second observation point in the second set of observation points is at the ending point of the route.

3. The computer-implemented method of claim 2, wherein the received road network data includes a predetermined first node in a first set of nodes and a predetermined second node in a second set of nodes, and the method further comprising:
selecting the origin from the predetermined first node in the first set of nodes;
selecting the destination from the predetermined second node in the second set of nodes; and
generating the plurality of routes, wherein the one or more of the plurality of routes start from the selected origin and end at the selected destination.

4. The computer-implemented method of claim 2, the method further comprising:
comparing a first distance and a second distance, wherein the first distance is based on multiplying, by a predetermined value, a distance of the shortest route from the origin to the destination, and wherein the second distance of the plurality of routes; and
excluding, based on the comparison, one or more routes from the plurality of routes, wherein the one or more routes includes the second distance that is equal to or exceeds the first distance.

5. The computer-implemented method of claim 2, the method further comprising:
identifying one or more routes in the plurality of routes, wherein the one or more routes are without the first set of observation points; and
excluding the identified one or more routes from the plurality of routes.

6. The computer-implemented method of claim 1, wherein the received road network data includes a predetermined first node in a first set of nodes and a predetermined second node in a second set of nodes, and the method further comprising:
selecting the origin from the predetermined first node in the first set of nodes;
selecting the destination from the predetermined second node in the second set of nodes; and
generating the plurality of routes, wherein the one or more of the plurality of routes start from the selected origin and end at the selected destination.

7. A system for estimating a traffic volume of moving objects, the system comprises:
a processor; and
a memory storing computer-executable instructions that when executed by the processor cause the system to:
receive road network data;
generate, based on the received road network data, a plurality of routes from an origin to a destination of one or more of the moving objects;
generate, based on the generated plurality of routes and a first set of observation points for observing a set of traffic volume data of the moving objects, a routing matrix, wherein the routing matrix indicates whether or not the moving object traveling along each of the plurality of routes is observed at each of the first set of observation points;
generate, based on the generated plurality of routes and a second set of observation points for observing a set of visitor volume data of the moving objects, a visitor matrix, wherein the visitor matrix indicates whether or not the moving objects traveling along each of the plurality of routes departs from or arrives at one of the second set of observation points;
receive the set of traffic volume data of the moving objects observed at each of the first set of observation points;
receive the set of visitor volume data of the moving objects observed at each of the second set of observation points;
estimate the traffic volume of the moving objects on one or more routes of the plurality of routes based on:
the generated routing matrix,
the generated visitor matrix,
the received set of traffic volume data at the first set of observation points, and
the received set of traffic volume data at the second set of observation points, wherein the estimating further comprises estimating the traffic volume of the moving object by minimizing a sum of:
a first error between the received traffic volume data and the estimated traffic volume data, a second error between a variation in the visitor volume data and an estimated variation in the visitor volume data, and a number of the moving objects; and display the estimated traffic volume on a display device.

8. The system of claim 7, wherein the one or more of the moving objects depart from a starting point of a route when a first observation point in the second set of observation points is at the starting point of the route, and wherein the one or more of the moving objects arrives at the starting point of the route when a second observation point in the second set of observation points is at the ending point of the route.

9. The system of claim 8, wherein the received road network data includes a predetermined first node in a first set of nodes and a predetermined second node in a second set of nodes, and the computer-executable instructions when executed further causing the system to:

select the origin from the predetermined first node in the first set of nodes;

select the destination from the predetermined second node in the second set of nodes; and determine the plurality of routes, wherein the one or more of the plurality of routes start from the selected origin and end at the selected destination.

10. The system of claim 8, the computer-executable instructions when executed further causing the system to:

compare a first distance and a second distance, wherein the first distance is based on multiplying, by a predetermined value, a distance of the shortest route from the origin to the destination, and wherein the second distance of the plurality of routes; and exclude, based on the comparison, one or more routes from the plurality of routes, wherein the one or more routes includes the second distance that is equal to or exceeds the first distance.

11. The system of claim 8, the computer-executable instructions when executed further causing the system to:

identify one or more routes in the plurality of routes, wherein the one or more routes are without the first set of observation points; and exclude the identified one or more routes from the plurality of routes.

12. The system of claim 7, wherein the received road network data includes a predetermined first node in a first set of nodes and a predetermined second node in a second set of nodes, and the computer-executable instructions when executed further causing the system to:

select the origin from the predetermined first node in the first set of nodes;

select the destination from the predetermined second node in the second set of nodes; and generate the plurality of routes, wherein the one or more of the plurality of routes start from the selected origin and end at the selected destination.

13. A computer-readable non-transitory recording medium storing computer-executable instructions that when executed by a processor cause a computer system to:

receive road network data;

generate, based on the received road network data, a plurality of routes from an origin to a destination of one or more of the moving objects;

generate, based on the generated plurality of routes and a first set of observation points for observing a set of traffic volume data of the moving objects, a routing matrix, wherein the routing matrix indicates whether or not the moving object traveling along each of the plurality of routes is observed at each of the first set of observation points;

generate, based on the generated plurality of routes and a second set of observation points for observing a set of visitor volume data of the moving objects, a visitor matrix, wherein the visitor matrix indicates whether or not the moving objects traveling along each of the plurality of routes departs from or arrives at one of the second set of observation points;

receive the set of traffic volume data of the moving objects observed at each of the first set of observation points;

receive the set of visitor volume data of the moving objects observed at each of the second set of observation points;

estimate the traffic volume of the moving objects on one or more routes of the plurality of routes based on:

the generated routing matrix, the generated visitor matrix, the received set of traffic volume data at the first set of observation points, and the received set of traffic volume data at the second set of observation points wherein the estimating further comprises estimating the traffic volume of the moving object by minimizing a sum of:

a first error between the received traffic volume data and the estimated traffic volume data, a second error between a variation in the visitor volume data and an estimated variation in the visitor volume data, and a number of the moving objects; and display the estimated traffic volume on a display device.

14. The computer-readable non-transitory recording medium of claim 13, wherein the one or more of the moving objects depart from a starting point of a route when a first observation point in the second set of observation points is at the starting point of the route, and wherein the one or more of the moving objects arrives at the starting point of the route when a second observation point in the second set of observation points is at the ending point of the route.

15. The computer-readable non-transitory recording medium of claim 14, wherein the received road network data includes a predetermined first node in a first set of nodes and a predetermined second node in a second set of nodes, and the computer-executable instructions when executed further causing the system to:

select the origin from the predetermined first node in the first set of nodes;

select the destination from the predetermined second node in the second set of nodes; and generate the plurality of routes, wherein the one or more of the plurality of routes start from the selected origin and end at the selected destination.

16. The computer-readable non-transitory recording medium of claim 14, the computer-executable instructions when executed further causing the system to:

compare a first distance and a second distance, wherein the first distance is based on multiplying, by a predetermined value, a distance of the shortest route from the origin to the destination, and wherein the second distance of the plurality of routes; and exclude, based on the comparison, one or more routes from the plurality of routes, wherein the one or more routes includes the second distance that is equal to or exceeds the first distance.

17. The computer-readable non-transitory recording medium of claim 14, the computer-executable instructions when executed further causing the system to:
  identify one or more routes in the plurality of routes, wherein the one or more routes are without the first set of observation points; and
  exclude the identified one or more routes from the plurality of routes.

\* \* \* \* \*